(12) United States Patent
Sanders et al.

(10) Patent No.: US 10,094,664 B2
(45) Date of Patent: Oct. 9, 2018

(54) APPARATUS AND METHOD FOR DIMINISHING BIAS ERROR IN RESONANT FIBER OPTIC GYROSCOPES

(71) Applicant: Honeywell International Inc., Morris Plains, NJ (US)

(72) Inventors: Glen A. Sanders, Scottsdale, AZ (US); Lee K. Strandjord, Tonka Bay, MN (US); Tiequn Qiu, Glendale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/360,875

(22) Filed: Nov. 23, 2016

(65) Prior Publication Data

US 2018/0143022 A1    May 24, 2018

(51) Int. Cl.
*G01C 19/72*    (2006.01)

(52) U.S. Cl.
CPC .................................. *G01C 19/727* (2013.01)

(58) Field of Classification Search
CPC ......... G01C 19/00; G01C 19/64; G01C 19/72
See application file for complete search history.

(56) References Cited

U.S. PATENT DOCUMENTS

| | | |
|---|---|---|
| 4,274,742 A | 6/1981 | Lustig |
| 4,673,293 A | 6/1987 | Sanders |
| 4,881,817 A | 11/1989 | Kim et al. |
| 5,018,857 A | 5/1991 | Sanders et al. |
| 5,018,858 A | 5/1991 | Malvern |
| 5,237,387 A | 8/1993 | Sanders |
| 5,493,623 A | 2/1996 | Frische et al. |
| 6,046,810 A | 4/2000 | Sanders et al. |
| 8,259,301 B2 | 9/2012 | Strandjord et al. |
| 2002/0051133 A1 | 5/2002 | Honda et al. |
| 2007/0121116 A1* | 5/2007 | Greening ............. G01C 19/726 356/460 |
| 2007/0242276 A1* | 10/2007 | Hughes ................ G01C 19/727 356/461 |
| 2008/0079947 A1 | 4/2008 | Sanders et al. |
| 2008/0218765 A1* | 9/2008 | Bergh .................. G01C 19/726 356/464 |
| 2015/0369606 A1 | 12/2015 | Sanders et al. |
| 2016/0320188 A1 | 11/2016 | Deppe-Reibold et al. |

FOREIGN PATENT DOCUMENTS

| | | |
|---|---|---|
| CA | 1231252 A | 1/1988 |
| JP | 2009047684 | 3/2009 |

OTHER PUBLICATIONS

Sanders et al., "Resonator Fiber Optic Gyro With High Backscatter-Error Suppression Using Two Independent Phase-Locked Lasers (Power Point)", "SPIE 9634, 24th International Conference on Optical Fibre Sensors, Sep. 28, 2015", Aug. 17, 2015, pp. 120, Published in: US.

(Continued)

*Primary Examiner* — Jonathan Hansen
(74) *Attorney, Agent, or Firm* — Fogg & Powers LLC

(57) ABSTRACT

In one embodiment, a method is provided. The method comprises generating a waveform; measuring signals representative of angular rotation rate in a linear region of the waveform; and diminishing bias error about at least one of a waveform's maxima and minima.

20 Claims, 9 Drawing Sheets

(56) References Cited

OTHER PUBLICATIONS

Sanders et al., "Resonator Fiber Optic Gyro With High Backscatter-Error Suppression Using Two Independent Phase-Locked Lasers", "SPIE 9634, 24th International Conference on Optical Fibre Sensors, Sep. 28, 2015", Mar. 23, 2015, pp. 1-4, Published in: US.
European Patent Office, "Office Action for EP Application No. 10153389.1", "from Foreign Counterpart of U.S. Appl. No. 12/565,510", dated Oct. 27, 2011, pp. 1-4, Published in: EP.
Japanese Patent Office, "Notice of Allowance for JP Application No. 2010-038195", "from Foreign Counterpart of U.S. Appl. No. 12/565,510", dated Dec. 17, 2012, pp. 1-3, Published in: JP.
Japanese Patent Office, "Office Action for JP Patent Application No. 2010-038195", "from Foreign Counterpart of U.S. Appl. No. 12/565,510", dated Jul. 10, 2012, pp. 1-2, Published in: JP.
United States Patent and Trademark Office, "Notice of Allowance", "from U.S. Appl. No. 12/565,510", dated May 11, 2012, pp. 1-8, Published in: US.
European Patent Office, "Deceision to Grant for EP Application No. 10153389.1", "from Foreign Couterpart of U.S. Appl. No. 12/565,510", dated Jun. 1, 2012, pp. 1-2, Published in: EP.
United States Patent and Trademark Office, "Office Action", "from U.S. Appl. No. 12/565,510", dated Dec. 20, 2011, pp. 1-6, Published in: US.
European Patent Office, "Communication Pursuant to Article 94(3) for EP Application No. 10153389.1", "Foreign Counterpart to U.S. Appl. No. 12/565,510", Jul. 1, 2011, pp. 1-4, Published in: EP.
European Patent Office, "Extended European Search Report from EP Application No. 17201306.2 dated Apr. 20, 2018", "From Foreign Counterpart of U.S. Appl. No. 15/360,875", dated Apr. 20, 2018, pp. 1-7, Published in: EP.

\* cited by examiner

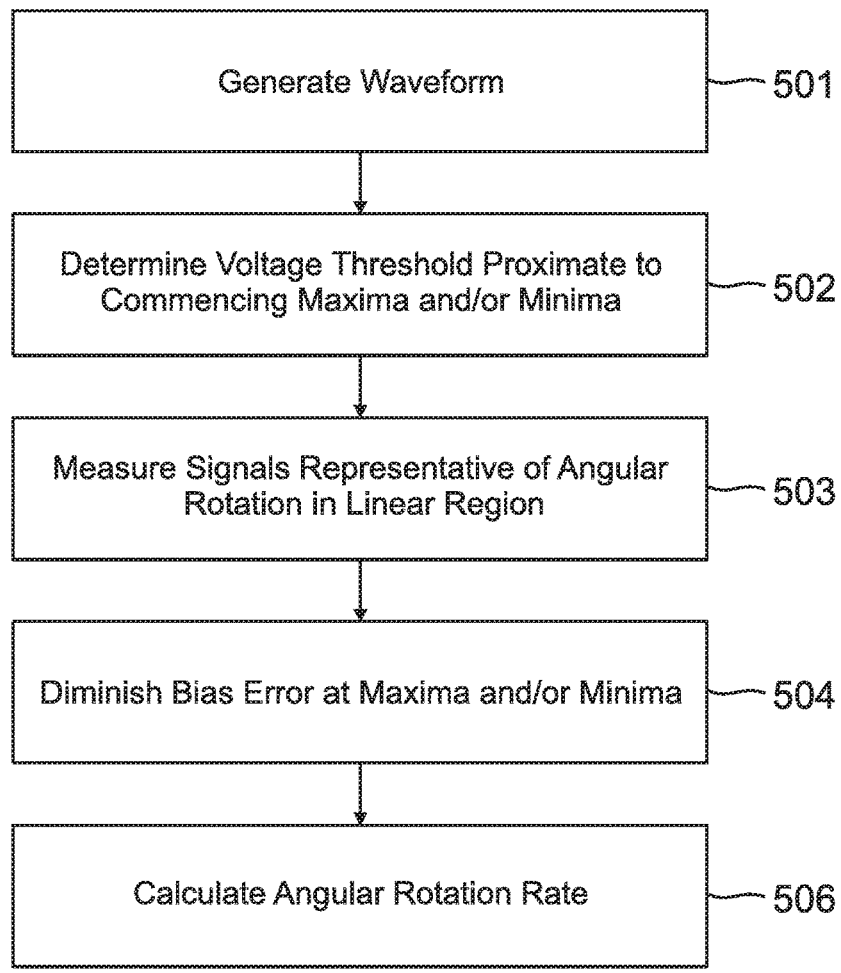

APPARATUS AND METHOD FOR DIMINISHING BIAS ERROR IN RESONANT FIBER OPTIC GYROSCOPES

BACKGROUND

Resonant fiber optic gyroscopes (RFOGs) have better rotation sensitivity for a given diameter then laser ring gyroscopes and interferometer fiber optic gyroscopes. Thus, RFOGs are desirable because a given level of rotation sensitivity can be achieved with smaller RFOGs, reducing the size of inertial navigation systems incorporating RFOGs. RFOGs, however, are susceptible to bias error because of imperfections in optical components, e.g. due to birefringence, which create of one or more parasitic light waves having undesired polarization states. Such parasitic light waves circulate in the RFOG along with the desired light signals, and cannot be distinguished from the desired light signals. Such bias errors vary over time, including due to changes in temperature. Therefore, there is a need to reduce such bias error.

SUMMARY

In one embodiment, a method is provided. The method comprises generating a waveform; measuring signals representative of angular rotation rate in a linear region of the waveform; and diminishing bias error about at least one of the waveform's maxima and minima.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 5 illustrates an exemplary method of operation of an RFOG with processing to diminish bias error;

FIG. 6 illustrates embodiments of blocks of FIG. 5;

In accordance with common practice, the various described features are not drawn to scale but are drawn to emphasize specific features relevant to the exemplary embodiments. Reference characters denote like elements throughout figures and text.

DETAILED DESCRIPTION

Figure 1A:
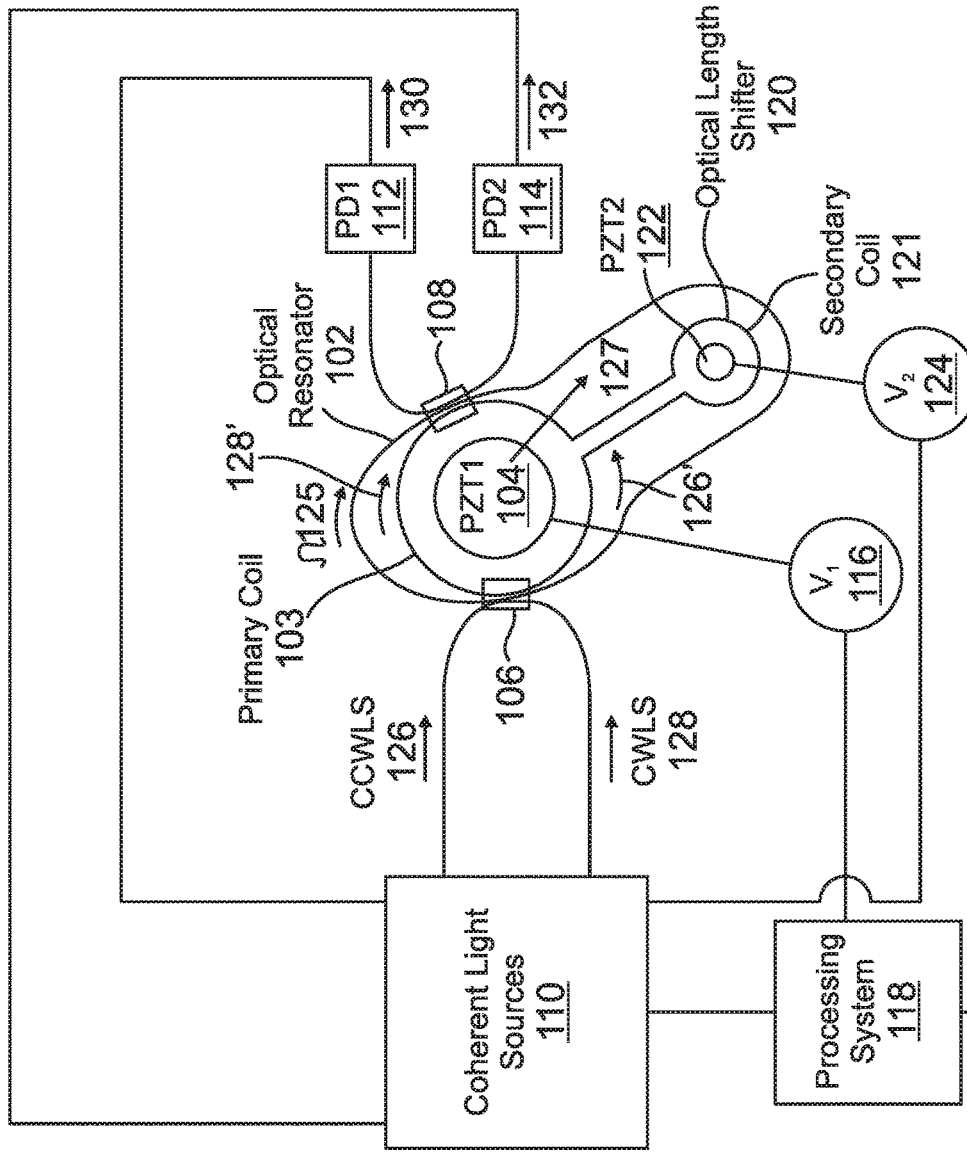
FIG. 1A illustrates an exemplary RFOG with processing to diminish bias error.

In the following detailed description, reference is made to the accompanying drawings that form a part hereof, and in which is shown by way of illustration specific illustrative embodiments. However, it is to be understood that other embodiments may be utilized and that structural, mechanical, and electrical changes may be made. Furthermore, the method presented in the drawing figures and the specification is not to be construed as limiting the order in which the individual steps may be performed. The following detailed description is, therefore, not to be taken in a limiting sense.

An RFOG with processing to reduce bias error may be used to overcome the above referenced problem. FIG. 1A illustrates an exemplary RFOG with processing to diminish bias error 100. In one embodiment, the RFOG with processing to diminish bias error 100 includes an optical resonator 102 including a primary coil of optical fiber (primary coil) 103 which is wound around a first piezo-electric transducer (PZT) tube (PZT1) 104. The optical resonator 102 is coupled to coherent light sources 110 by a first optical coupler 106. The optical resonator 102 is coupled to a first photodetector (PD1) 112 and a second photodetector (PD2) 114 by a second optical coupler 108.

The first photodetector 112 and the second photodetector 114 are coupled to the coherent light sources 110. A first voltage source ($V_1$) 116 is coupled to PZT1 104. In one embodiment, the first voltage source 116 is an arbitrary waveform generator. The first voltage source 116 is configured to generate a voltage waveform to drive PZT1 104, i.e. to cause PZT1 104 to expand and contract to modulate the length of the primary coil of optical fiber 103. By changing the length of the primary coil of optical fiber 103, the optical path length of the primary coil of optical fiber 103 is correspondingly changed due to the changing of the length and/or the index of refraction of the primary coil of optical fiber 103. In one embodiment, the voltage waveform, generated by the first voltage source 116, is periodic or substantially periodic. In another embodiment, the frequency of the voltage waveform is greater than 100 Hz. In another embodiment, the frequency of the voltage waveform is greater than 1000 Hz.

In one embodiment, a processing system 118 is coupled to both the coherent light sources 110 and the first voltage source 116. In another embodiment, the processing system 118 is configured to control the first voltage source 116 and process data provided by the coherent light sources. In a further embodiment, the processing system 118 is configured to generate a signal, representative of the angular rotation rate around the input axis 127, with diminished bias error. The angular rotation rate 125, about the input axis 127, is also denoted as Ω. In yet a further embodiment, the processing system 118 is configured to generate a signal, representative of the angular rotation rate 125 around the input axis 127, with diminished bias error including diminished bias error arising about at least one of a waveform's maxima and minima. In one embodiment, the processing system is configured to generate the signal, representative of the angular rotation rate 125 around the input axis 127, with diminished bias error including diminished bias error arising about a maximum or minimum of the waveform following a linear region. The input axis 127 is parallel to the center axis of the primary coil 103, and thus parallel to the center axis of PZT1 104. In one embodiment, the input axis 127 is a centerline through the primary coil 103, and thus through the centerline of PZT1 104. However, this is just one example. The input axis 127 need not be the centerline through primary coil 103, and thus through PZT1 104.

In one embodiment, the optical resonator 102 includes an optical length shifter 120 including a secondary coil of optical fiber (secondary coil) 121 wound, or coiled, around a second piezo-electric transducer tube (PZT2) 122. In another embodiment, the diameter of the secondary coil of optical fiber 121 is substantially smaller than the diameter of the primary coil of optical fiber 103. A second voltage source (V$_2$) 124 is coupled to PZT2 122. The second voltage source 124 is coupled to the coherent light sources 110. As discussed above for the optical resonator 102, the optical length shifter 120 is also configured to vary the optical path length of the optical resonator 102.

Figure 1B:
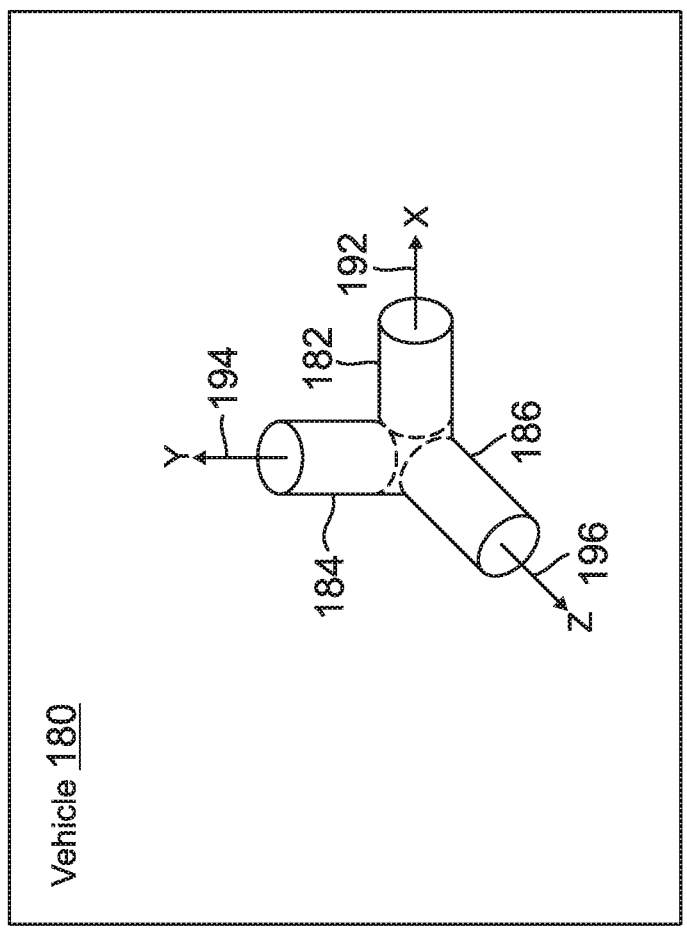
FIG. 1B illustrates an exemplary vehicle incorporating at least one RFOG with processing to diminish bias error.

FIG. 1B illustrates an exemplary vehicle 180 incorporating at least one RFOG with processing to diminish bias error 100. The vehicle can be an aircraft, spacecraft, rocket, missile, land vehicle, space craft, water vehicle, or any other type of vehicle. In one embodiment the vehicle incorporates at least one RFOG with processing to diminish bias error 100. For example, as illustrated in FIG. 1B, the vehicle 180 incorporates three RFOGs with processing to diminish bias error 182, 184, 186, respectively for an x-axis 192, y-axis 194 and z-axis 196. Thus, the vehicle 180 can determine angular rotation, with diminished by error, around each of the x-axis 192, y-axis 194 and z-axis 196.

Returning to FIG. 1A, the operation of the exemplary RFOG with processing to diminish bias error 100 will now be explained. The coherent light sources 110 generate a counter-clockwise light signal (CCWLS) 126 and clockwise light signal (CWLS) 128 respectively having frequencies $f_{ccw}$ and $f_{cw}$. Portions of counter-clockwise light signal 126 and the clockwise light signal 128 enter the primary coil 103, creating a counter-clockwise light signal 126' and a clockwise light signal 128' that respectively circulate counter-clockwise and clockwise around the primary coil 103. As the RFOG with processing to diminish bias error 100 is rotated about its input axis 127, the resonant frequency, for each of the paths of the counter-clockwise light signal 126' and clockwise light signal 128', changes due to the Sagnac effect.

In one embodiment, which excludes the optical length shifter 120 and second voltage source 124, the RFOG with processing to diminish bias error 100 uses servo control to adjust, or vary, the frequencies of the counter-clockwise light signal 126' and clockwise light signal 128' so that the frequencies of such signals equal the resonance frequencies for each of their respective paths. The first photodetector 112 and the second photodetector 114 generate a first feedback signal 130 and a second feedback signal 132 whose amplitudes vary based upon the incident powers of respectively a portion of the counter-clockwise light signal 126' and a portion of the clockwise light signal 128' that exit the primary coil 103. In one embodiment, the first feedback signal 130 and the second feedback signal 132 are electrical signals. The first feedback signal 130 and a second feedback signal 132 are coupled to respective servos for the sources of the counter-clockwise light signal 126 and the clockwise light signal 128. Servo mechanisms, e.g. electronic circuits in the coherent light sources 110, alter the frequencies of the counter-clockwise light signal 126' and the clockwise light signal 128' to equal the resonant frequencies of the respective paths for those two signals. To suppress bias error, the voltage level of the first voltage source 116, and hence the optical path length of the optical resonator 102, is modulated in a manner subsequently described.

In one embodiment, the processing system 118 controls the voltage level of the first voltage source 116. In another embodiment, the processing system 118 provides a signal 129 representative of the angular rate of rotation 125 around the input axis 127. In another embodiment, the signal 129 representative of the angular rate of rotation 125 about the input axis 127 is dependent upon the difference between the frequencies of the counter-clockwise light signal 126 and the clockwise light signal 128, respectively $f_{ccw}$ and $f_{cw}$, which is $\Delta f$. In a further embodiment, the signal 129 representative of the angular rate of rotation 125 about the input axis 127 is a difference between $f_{ccw}$ and $f_{cw}$, $\Delta f$. In yet another embodiment, $f_{ccw}$ and $f_{cw}$ are provided by the servos in the coherent light sources 110. In yet a further embodiment, the signal 129 representative of the angular rate of rotation 125 about the input axis 127 is an angular rate of rotation, $\Omega$, 125 where $\Omega = (\lambda * \Delta f * P)/(4*A)$, $\lambda$ is substantially equal to the average wavelength of the counter-clockwise light signal 126 and the clockwise light signal 128, A is the area enclosed by the primary coil 103 and P is the perimeter of the primary coil 103. In yet a further embodiment, the coherent light sources 110 provide the signal 129 representative of the angular rate of rotation 125 around the input axis 127.

Figure 2A:
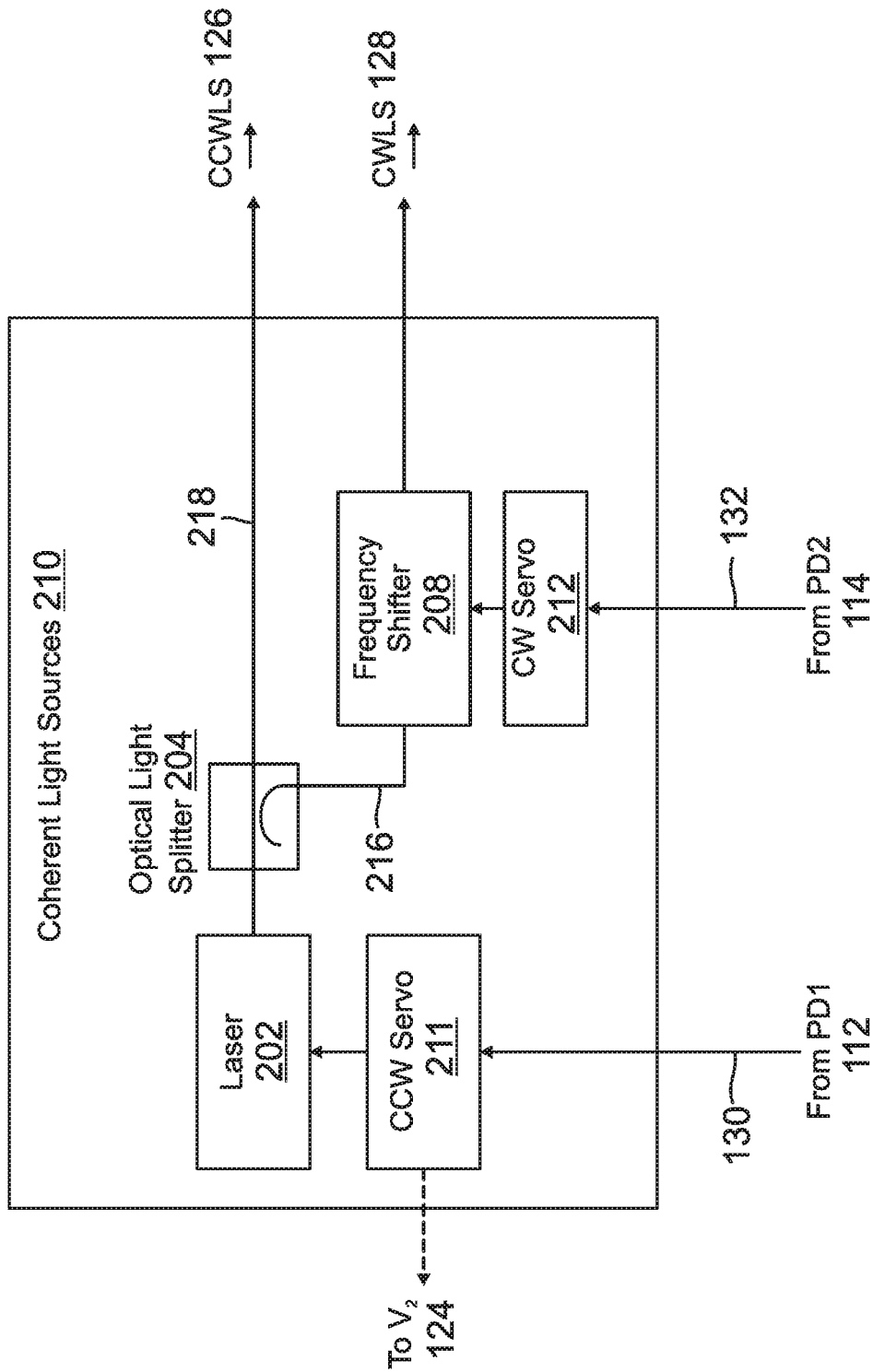
FIG. 2A illustrates exemplary coherent light sources.

FIG. 2A illustrates exemplary coherent light sources 210. In this embodiment, the exemplary coherent light sources 210 comprise a laser 202 coupled to an optical light splitter 204. The laser 202 generates the counter-clockwise light signal 126, having a frequency $f_{ccw}$. A first output 216 of the optical light splitter 204 is coupled to a frequency shifter 208. The second output 218 of the optical light splitter 204 provides the counter-clockwise light signal 126, having a frequency $f_{ccw}$. The frequency shifter 208 generates a clockwise light signal 128 having a frequency $f_{cw}$ that is shifted, or offset, from frequency $f_{ccw}$.

The coherent light sources 210 includes a CW servo 212 coupled to the frequency shifter 208, and a CCW servo 211 coupled to the laser 202. The output of the second photodetector 114 is coupled to the CW servo 212. The output of the first photodetector 112 is coupled to a CCW servo 211. The CCW servo 211 and the CW servo 212 alter the frequencies of respectively the counter-clockwise light signal 126' and the clockwise light signal 128' to equal the resonant frequencies of the respective optical paths for those two signals.

In one embodiment, the CCW servo 211 and the CW servo 212 are located within the coherent light sources 210. In another embodiment, all or a part of the CCW servo 211 and/or the CW servo 212 are located elsewhere, e.g. within the processing system 118.

In one embodiment, returning to FIG. 1, in lieu of modifying the output frequency of the laser 202, the CW servo 212 is coupled to the second voltage source 124 and changes the dimensions, e.g. the diameter, of PZT2 122. Thus, the optical path length of the optical length shifter 120 is correspondingly varied, e.g. lengthened or shortened. As a result, the optical path length of the optical resonator 104 is correspondingly varied.

Figure 2B:
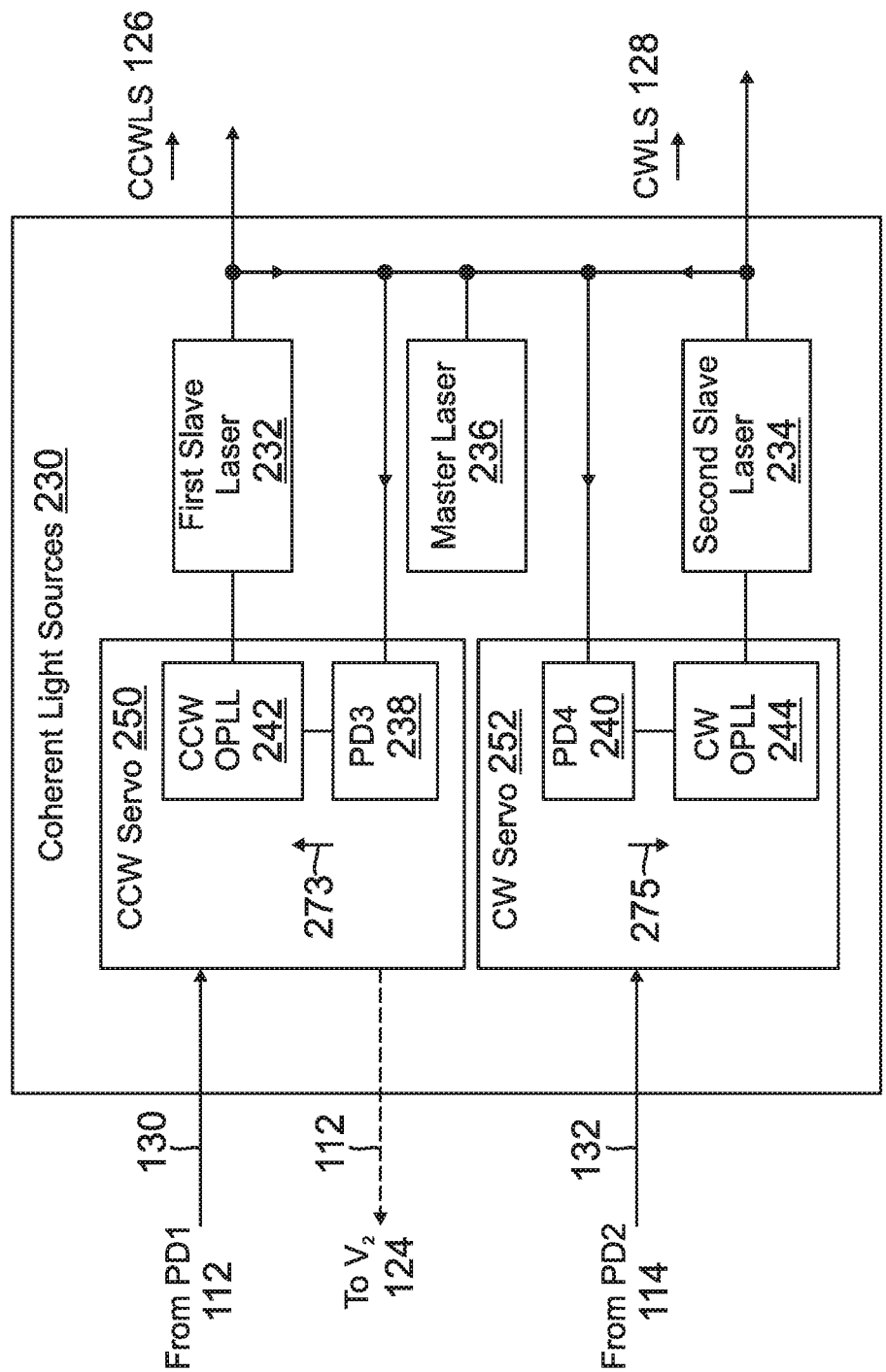
FIG. 2B illustrates another exemplary coherent light sources.

FIG. 2B illustrates another exemplary coherent light sources 230. The coherent light sources 230 includes a master laser 236 coupled to a first slave laser 232 and a second slave laser 234. The first slave laser 232 and a second slave laser 234 respectively generate the counter-clockwise light signal 126 and the clockwise light signal 128. A CCW servo 250 is coupled to the first slave laser 232. A CW servo 252 is coupled to the second slave laser 234. In one embodiment, the CCW servo 250 includes a CCW optical phase lock loop (OPLL) 242 coupled to a third photodetector (PD3) 238. The third photodetector 238 is coupled to the output of the master laser 236. In another embodiment, the CW servo 252 includes a CW OPLL 244 coupled to a fourth photodetector (PD4) 240. The fourth photodetector 240 is coupled to the output of the master laser 236. The third photodetector 238 and the fourth photodetector 240 generate a third feedback signal 273 and a fourth feedback signal 275 whose amplitudes vary based upon the incident powers of the light signal generated by the master laser 236. The CCW OPLL 242 and the CW OPLL 244 are used to phase lock respectively the output frequencies of the first slave laser 232, $f_{ccw}$, and the second slave laser 234, $f_{cw}$. The CCW servo 250 and the CW servo 252 alter, through respectively the CCW OPLL 242 and CW OPLL 244, the frequencies of the counter-clockwise light signal 126 and the clockwise light signal 128 to equal the resonant frequencies of the respective paths for those two signals.

In one embodiment, the CCW servo 250 and the CW servo 252 are located within the coherent light sources 230. In another embodiment, all or a part of the CCW servo 250 and/or the CW servo 252 are located elsewhere, e.g. within the processing system 118.

In another embodiment, returning to FIG. 1, in lieu of modifying the output frequency of the first slave laser 232, the CCW servo 250 is coupled to the second voltage source 124 and changes the dimensions, changes the dimensions, e.g. the diameter, of PZT2 122. Thus, the optical path length of the optical length shifter 120 is correspondingly varied, e.g. lengthened or shortened. As a result, the optical path length of the optical resonator 104 is correspondingly varied.

Figure 3:
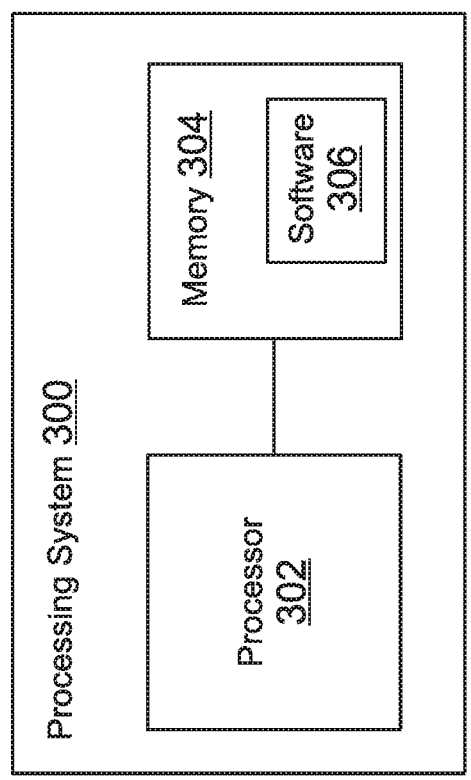
FIG. 3 illustrates an exemplary processing system.

FIG. 3 illustrates an exemplary processing system 300. The processing system 300 includes a processor 302 coupled to a memory 304. Software 306 is stored in the memory 304, and executed in the processor 302. In one embodiment, the processing system 300 calculates and/or analyzes Δf, and/or Ω, e.g. by executing software 306 with corresponding program instructions. In another embodiment, the processing system 300 performs processing to diminish bias error, e.g. by executing the software 306 with corresponding program instructions. In a further embodiment, the processing system 300 controls the first voltage source 116, including the amplitude, frequency, and form (including the locations by time of maxima and minima) of the voltage waveform generated by the first voltage source 116, e.g. by executing the software 306 with corresponding program instructions. However, in other embodiments, the processing system 118 may be implemented by a state machine or a field-programmable gate array.

U.S. Pat. No. 8,259,301, hereby incorporated herein by reference in its entirety, discloses driving a PZT tube with a sinusoidal or triangle voltage to vary the length of a fiber coil of a resonator in an RFOG to suppress bias errors by frequency shifting them to a higher frequency then the expected rate of rotation about the input axis 126. The invention disclosed in U.S. Pat. No. 8,259,301 does not suppress all bias error.

Figures 4A, 4B:
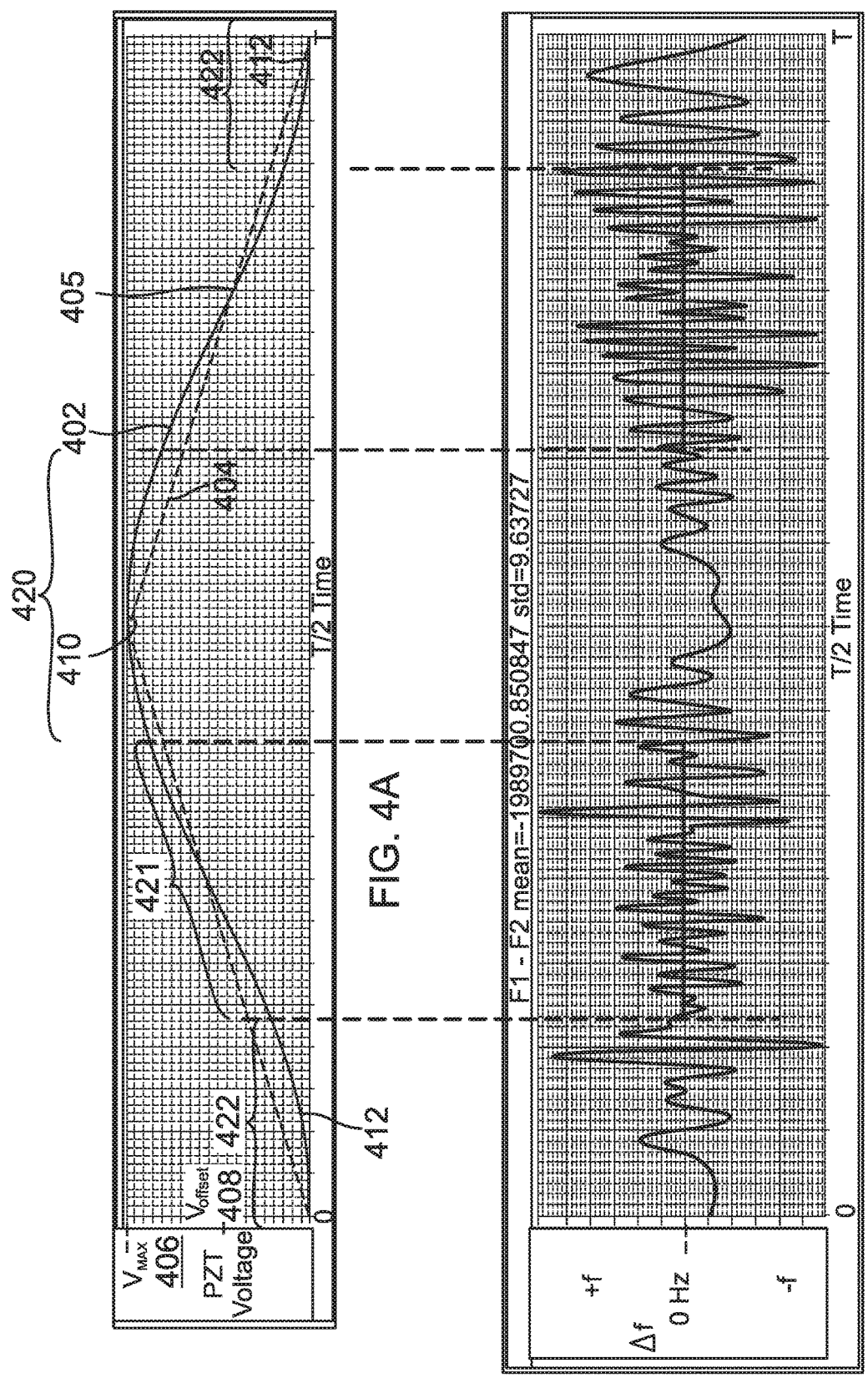
FIG. 4A illustrates an exemplary PZT voltage wave forms.
FIG. 4B illustrates an exemplary RFOG bias error.

FIG. 4A illustrates an exemplary PZT voltage wave forms, including a sinusoidal voltage waveform 402 and triangle voltage waveform 404. The illustrated PZT voltage wave forms have varying voltage over time. Each waveform has a maximum voltage ($V_{MAX}$) 406, a DC offset voltage ($V_{OFFSET}$) 408, maxima 410, and minima 412. The sinusoidal voltage waveform 402 has a maximum region 420, minimum regions 422, and substantially linear regions 421. The triangle voltage waveform 404 has maxima 410, minima 412, and linear regions 405 between each maximum and minimum.

Linear region(s) and substantially linear region(s) will hereafter be referred to as linear region(s) except if the term substantially linear region(s) is used to distinguish that term from linear region(s). Maximum region(s) and maxima (or a maximum) will hereafter be referred to as maxima (or a maximum) except if the term maximum region(s) is used to distinguish that term from maxima (or a maximum). Minimum region(s) and minima (or a minimum) will hereafter be referred to as minima (or a minimum) except if the term minimum region(s) is used to distinguish that term from minima (or a minimum).

FIG. 4B illustrates exemplary RFOG bias error, i.e. non-zero Δf when there is no rotation about the input axis 127. More particularly, the bias error illustrated in FIG. 4B corresponds to the sinusoidal voltage waveform 402 illustrated in FIG. 4A. In the linear regions of the sinusoidal voltage waveform 402, the bias error averages to zero. However, at the maxima 410 and minima 412, i.e. where the slope of the sinusoidal voltage is substantially zero, the bias error varies less and does not average to substantially zero. Thus, any measurement of Δf about maxima or minima includes bias error. The RFOG with processing to diminish bias error 100 reduces this bias error.

Operation of an exemplary RFOG with processing to diminish bias error 100 will now be further described. Processing operations to diminish bias error will be exemplified.

FIG. 5 illustrates an exemplary method 500 of diminishing bias error in an RFOG. In block 501, in one embodiment, generate, e.g. with the first voltage generator 116, a waveform, e.g. a voltage waveform, having linear regions which are proportionally larger by time then maxima 410 and minima 412. In another embodiment, the voltage waveform is used to drive PZT1 104.

In one embodiment, the waveform is periodic or substantially periodic. Periodic and substantially periodic will hereafter be referred to as periodic except if the term substantially periodic is used to distinguish that term from periodic. Examples of periodic waveforms with linear regions proportionally larger than their maxima 410 or minima 412 include a sinusoidal, triangle and saw tooth waveforms.

In one embodiment, in block 502, determine voltage threshold(s) proximate to commencing maxima 410 and a voltage threshold(s) proximate to commencing minima 412. In another embodiment, store such thresholds in the memory 304 of the processing system 118.

Next, in block 503, measure signals representative of angular rate of rotation 125 in the linear region of the waveform. In one embodiment, the frequency difference between the clockwise light signal 128 and the counter-clockwise light signal 126, Δf, is measured, e.g. by measuring $f_{ccw}$ and $f_{cw}$, and is representative of angular rate of rotation 125. In another embodiment, Δf may be calculated or measured in the coherent light sources 110 and/or processing system 118. The terms calculate and determine shall have the same meaning herein.

In one embodiment, the coherent light sources 110 may provide the difference between $f_{ccw}$ and $f_{cw}$ to the processing system 118, and the processing system 118 calculates Δf. In another embodiment, the difference between $f_{ccw}$ and $f_{cw}$ are measured periodically in time in the linear region of the waveform. In one embodiment, sample the difference between $f_{ccw}$ and $f_{cw}$ (or alternatively sample $f_{ccw}$ and $f_{cw}$) at a rate substantially higher, e.g. greater than 100 times or greater than 1000 times the frequency of the waveform.

In block 504, diminish bias error arising about maxima 410 or minima 412. In one embodiment, diminish bias error arising about a maximum 410 or minimum 412 succeeding the linear region. Different embodiments to implement block 504 will be subsequently described.

In block 506, the angular rotation rate 125 around the input axis 127 is calculated. In one embodiment the angular rotation rate 125 is calculated using the equation: $\Omega = (\lambda * \Delta f * P)/(4*A)$. The angular rotation rate 125 is calculated based upon Δf. In another embodiment, Δf is calculated periodically. In yet another embodiment, the angular rotation rate 125 is calculated by the processing system 118. In a further embodiment, the angular rotation rate 125 is calculated by the coherent light sources 110. In yet a further embodiment, the average of Δf over at least one half period of a cycle of a waveform is calculated prior to calculating the angular rotation rate 125.

Because the frequency of the waveform, e.g. generated by the first voltage source 116, is at least one order, and preferably two or more orders of magnitude, greater than the maximum angular rotation rate of the RFOG with processing to diminish bias error 100, in one embodiment, an average of samples of angular rate of rotation, Ω, during at least one half cycle or more of the waveform of the signal driving PZT1, will have diminished bias error.

Exemplary embodiments of blocks illustrated in FIG. 5 will now be described. FIG. 6 illustrates embodiments of blocks of FIG. 5. In this exemplary method of operation of the RFOG with processing to diminish bias error 100 only generates signal(s) 129 representative of the rate of angular rotation 125 in the linear region. In this exemplary method, block 503 of FIG. 5 comprises block 602, determining the start and end points for the linear region, and block 603, measuring the signal representative of angular rate of rotation 125 within the linear region (as further described above in block 503). In one embodiment, estimates are made, and e.g. stored, for the start and end points of the linear regions, e.g. with the processing system 118, so that that samples of Δf are only measured within linear regions. For a voltage waveform having a predetermined fixed frequency, $V_{MAX}$ 406, and $V_{OFFSET}$ 408 such start and end points can be predetermined, and stored, e.g. in the memory 304 of the processing system 118. In another embodiment, the first voltage source 116 can provide the processing system 118 the voltage of the voltage waveform so that the processing system 118, or the coherent light sources 110 as directed by the processing system 118, only samples Δf within the linear region. In a further embodiment, the processing system 118 estimates the start and end points of the linear regions. Further, in this exemplary method, block 504 of FIG. 5 comprises block 604, terminating measurements at or about the end point.

Figure 7:
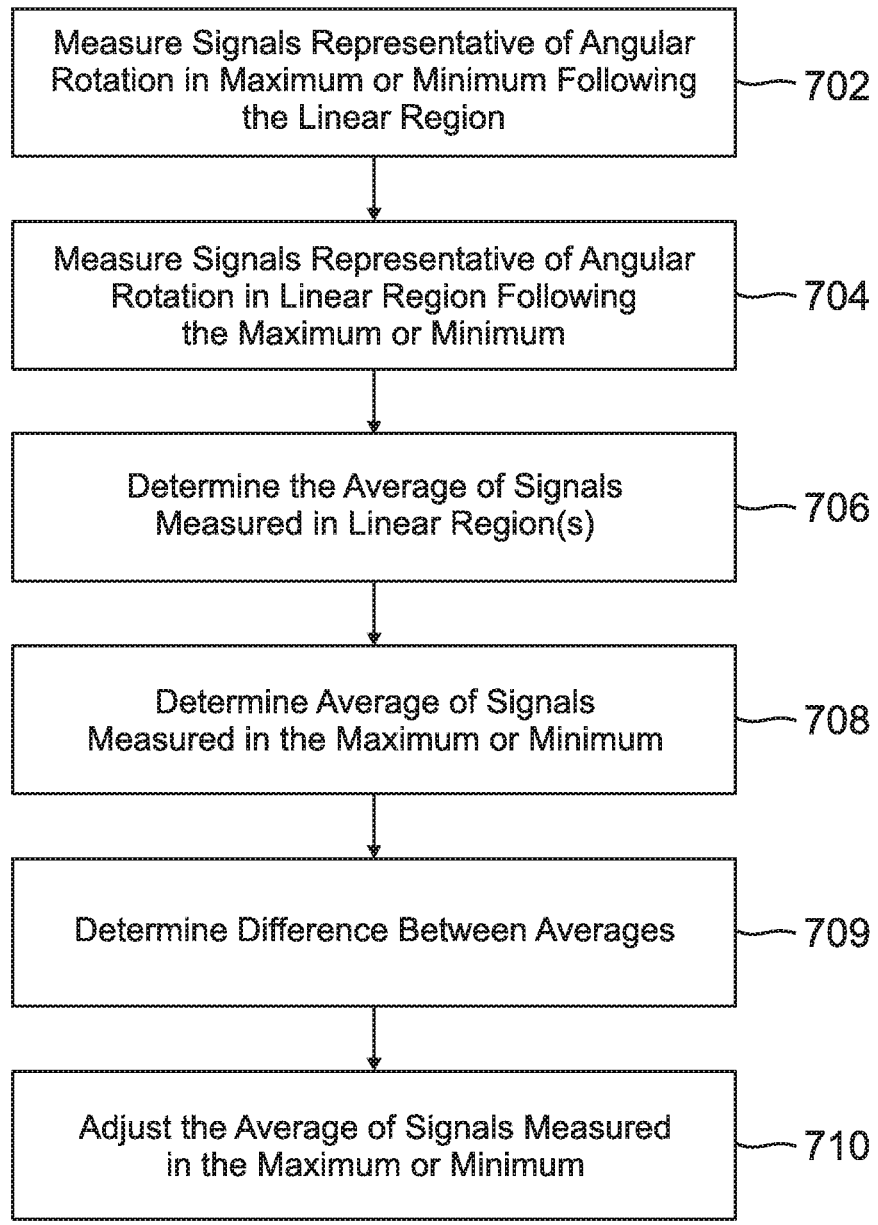
FIG. 7 illustrates embodiments of a block of FIG. 5.

FIG. 7 illustrates embodiments of a block of FIG. 5. In this exemplary method of operation of an RFOG with processing to diminish bias error 100, the processing system 118 adjusts, by adding or subtracting an offset, to the average measured signal representative of angular rate of rotation 125, e.g. Δf, at maxima 410 or minima 412. Thus, for this exemplary method of the RFOG with processing to diminish bias error 100, block 504 comprises the blocks illustrated in FIG. 7.

In block 702, measure, e.g. with the coherent light sources 110 and/or the processing system 118, signals representative of the angular rate of rotation 125 in the maximum 410 or minimum 412 following, or succeeding, the linear region. In one embodiment, the frequency difference between the clockwise light signal 128 and the counter-clockwise light signal 126 is measured, and is a signal representative of angular rate of rotation 125. In another embodiment, Δf is calculated from the frequencies of the clockwise light signal 128 and a counter-clockwise light signal 126, and is a signal representative of the angular rate of rotation 125.

In one embodiment, in block 704, measure, e.g. with the coherent light sources 110 and/or the processing system 118, the signal(s) 129 representative of angular rate of rotation 125 in the linear region following, or succeeding, the maximum 410 or minimum 412. Thus the linear regions are proximate to the maximum 410 or minimum 412. In another embodiment, the difference of frequencies of the clockwise light signal 128 and the counter-clockwise light signal 126 are measured, and is a signal representative of angular rate of rotation 125. In a further embodiment, Δf is calculated from the frequency difference between the clockwise light signal 128 and a counter-clockwise light signal 126, and is a signal representative of angular rate of rotation 125.

In block 706, determine, e.g. with software 306 executed by the processor 302 of the processing system 118, the average of the signals measured in the linear region(s). In block 708, calculate, e.g. with software 306 executed by the processor 302 of the processing system 118, the average of the signals 129 measured in the maximum 410 or minimum 412. In block 709, determine the difference between the average signal 129 representative of angular rotation rate 125 at the maximum 410 or minimum 412 and the average measured signal representative of angular rate of rotation in the linear region(s). In one embodiment, the difference is stored in the memory 304 of the processing system 118. In block 710, the average signal representative of angular rotation rate 125 at the maximum 410 or minimum 412 is adjusted, i.e. by adding or subtracting (depending upon the sign of the difference) the difference. In one embodiment, such adjusting is performed by software 306 executed by the processor 302 of the processing system 118. In another embodiment, the averages of signal representative of angular rotation rate 125 at all succeeding waveform maxima 410 and minima 412 are adjusted by the difference, e.g. with software 306 executed by the processor 302 of the processing system 118.

Figure 8:
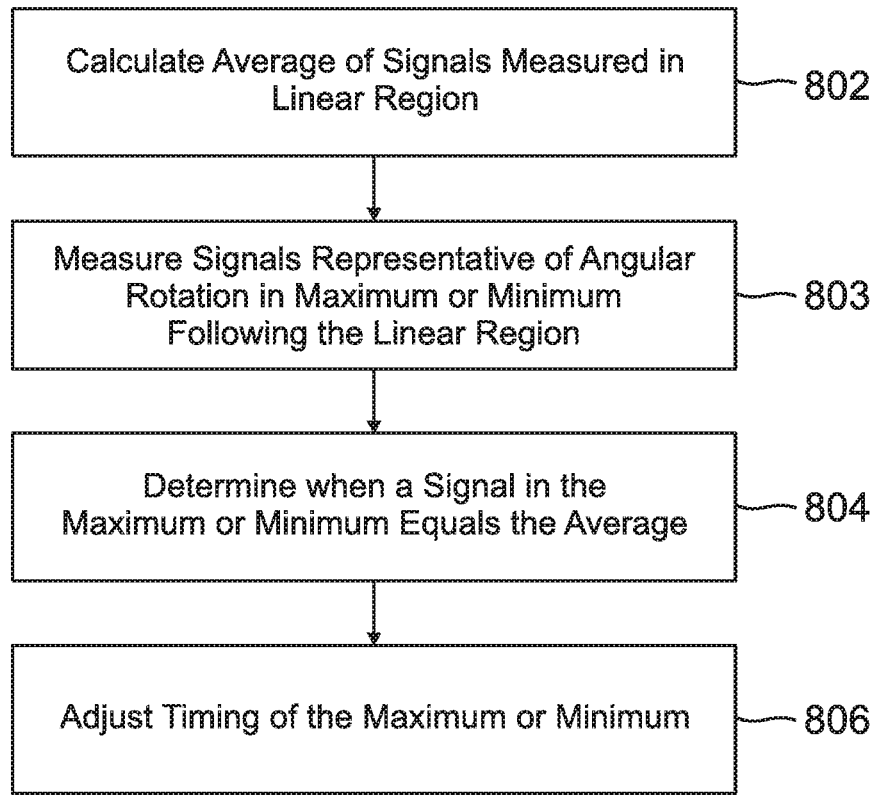
FIG. 8 illustrates embodiments of a block of FIG. 5.

FIG. 8 illustrates embodiments of a block of FIG. 5. In this exemplary method of operation of the RFOG with processing to diminish bias error 100, the processing system 118 shifts the maxima or minima to a point in time when the maxima region 410 or minima region 412 has a value equal to the average value, in the linear region, of the signal representative of angular rotation rate 125. The displacement of the maxima or minima substantially diminishes the region of bias error (i.e. the maxima region 410 or minima region 412).

In this exemplary method of the RFOG with processing to diminish bias error 100, block 504 comprises the blocks illustrated in FIG. 8. In block 802, calculate, e.g. with the processing system 118, the average of the signals 129 representative of angular rotation rate 125 measured in the linear region.

In block 803, measure signals 129 representative of angular rotation rate 125 in the maximum 410 or minimum 412 following the linear region. In one embodiment, the difference of the frequencies of the clockwise light signal 128 and the counter-clockwise light signal 126 is measured), and is a signal representative of angular rate of rotation 125. In another embodiment, Δf is calculated from the frequency differences of the clockwise light signal 128 and a counter-clockwise light signal 126, and is a signal representative of angular rate of rotation 125.

In block 804, determine, e.g. with the processing system 118, the time when the signal 129, representative of angular rotation rate 125 in a maximum 410 or minimum 412 following the linear region, equals or substantially equals the average of the signals 129 representative of angular rotation rate 125 measured in the linear region. Equal and substantially equal will hereafter be referred to as equal except if the term substantially equal is used to distinguish that term from equal. In one embodiment, the determination is made when the signal 129, representative of angular rotation rate 125 in a maximum 410 or minimum 412 following the linear region, first equals the average of the signals 129 representative of angular rotation rate 125 measured in the linear region.

In block 806, adjust the timing of maximum 410 or minimum 412 so that it is coincident or substantially coincident when the signal 129, representative of angular rotation rate 125 in a maximum 410 or minimum 412 following the linear region, equals the average of the signals 129 representative of angular rotation rate 125 measured in the linear region Coincident and substantially coincident will hereafter be referred to as coincident except if the term substantially coincident is used to distinguish that term from coincident. In one embodiment, the processing system 118 commands the first voltage source 116 to adjust the corresponding maximum 410 or minimum 412.

Figure 9:
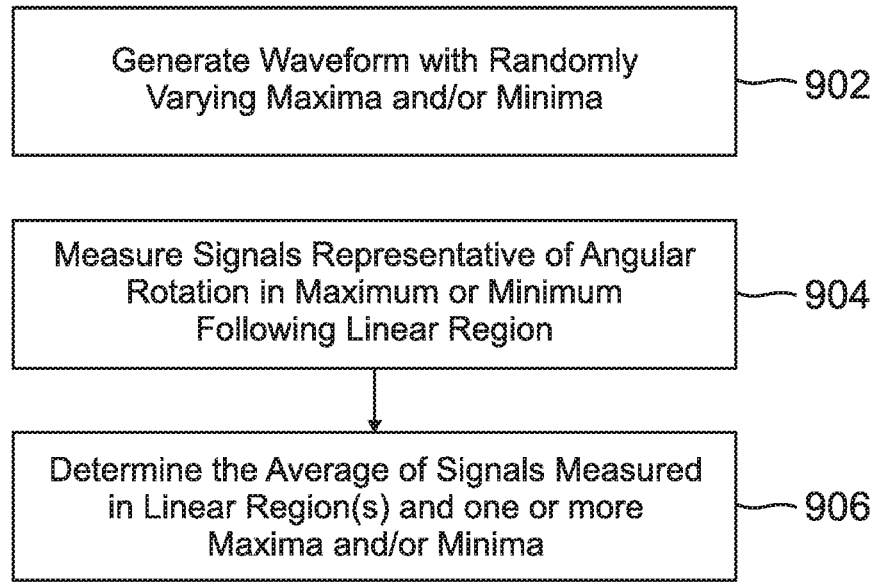
FIG. 9 illustrates embodiments of blocks of FIG. 5.

FIG. 9 illustrates embodiments of blocks of FIG. 5. In this embodiment of an exemplary method of operation of an RFOG with processing to diminish bias error 100, the waveform amplitude is randomly varied Block 501 further comprimises block 902: generating waveform amplitudes, or levels, with maxima 410 and minima 412 that vary randomly or pseudorandomly over time. Random and pseudorandom will hereafter be referred to as random except if the term pseudorandom is used to distinguish that term from random. In one embodiment, the maximum variation of the maxima 410 and minima 412 is constrained, e.g. to a percentage of the peak to peak amplitude of the waveform. In another embodiment, the maximum variation is twenty percent of the peak to peak amplitude.

In a further embodiment, this may be achieved by varying randomly a DC offset voltage 408, e.g. added to the time varying waveform with a DC offset voltage 408 of zero volts, in the first voltage source 116. Varying the DC offset voltage 408 varies both the maxima 410 and the minima 412. In one embodiment, the maximum variation of the DC offset voltage 408 is constrained, e.g. to a percentage of the unvaried value of the DC offset voltage 408. In another embodiment, the maximum variation is twenty percent unvaried DC offset voltage. In another embodiment, the DC offset voltage 408 can be varied at each maximum 410 and minimum 412, or at every n maximum 410 and minima 412.

In one embodiment, both the DC offset voltage 408 and $V_{MAX}$ 406 can be independently varied randomly so that the variations in the maxima 410 and minima 412 are uncorrelated. Randomly varying $V_{MAX}$ 406 results in a maximum voltage at maxima 410 randomly varying independent of the variations of the minima. In one embodiment, the maximum variation of the DC offset voltage 408 and $V_{MAX}$ 406 are constrained, e.g. respectively to a percentage of the unvaried value of the DC offset voltage 408 and the unvaried value of $V_{MAX}$ 406. In another embodiment, the maximum variation of the DC offset voltage 408 and the value of $V_{MAX}$ 406 is twenty percent unvaried value of the DC offset voltage 408 and the unvaried $V_{MAX}$ 406. In yet another embodiment, the DC offset voltage 408 can be varied at each maximum 410 and minimum 412, or at every n maximum 410 and minimum 412; and $V_{MAX}$ 406 can be varied every cycle or every n cycles.

In one embodiment, only $V_{MAX}$ 406 is randomly varied. In another embodiment, the maximum magnitude of the random variation of $V_{MAX}$ 406 is constrained, e.g. to a percentage of the unvaried value of $V_{MAX}$ 406. In another embodiment, the maximum variation is twenty percent of the unvaried value of $V_{MAX}$ 406.

In one embodiment, the processing system 118 generates random numbers, e.g. with one or more pseudorandom number generators implemented in the software 306, which are provided to the first voltage source 116 to generate a voltage waveform having a randomly varying DC offset voltage 408 and/or randomly varying $V_{MAX}$ 406.

Block 504 further compromises blocks 904 and 906. In block 904, measure signals representative of angular rotation rate 125 in the maximum 410 or minimum 412 succeeding the linear region. In one embodiment, the frequency difference between the clockwise light signal 128 and the counter-clockwise light signal 126 is measured, and is a signal representative of angular rate of rotation 125. In another embodiment, $\Delta f$ is calculated from the frequencies of the clockwise light signal 128 and a counter-clockwise light signal 126, and is a signal representative of angular rate of rotation 125.

Next, in block 906, calculate, e.g. with software 306 executed by the processor 302 of the processing system 118, the average of the signals measured in at least one linear region and at least one maximum 410 or minimum 412 that succeeds a linear region. In one embodiment, calculate the average of the signals measured in one or more linear regions and one or more maximum 410 or minimum 412 succeeding a linear region.

Example Embodiments

Example 1 includes a resonant fiber optic gyroscope, comprising: coherent light sources; wherein the coherent light sources generate a clockwise light signal and a counter-clockwise light signal; an optical resonator, coupled to the coherent light sources, formed from optical fiber and including a primary coil; an input axis parallel to a center axis of the primary coil; wherein a portion of the clockwise light signal and a portion of the counter-clockwise light signal enter and propagate respectively clockwise and counter-clockwise around the optical resonator and the input axis; a first photodetector coupled to the optical resonator; a second photodetector coupled to the optical resonator; wherein the first photodetector is configured to generate a first feedback signal whose amplitude varies based upon incident power of a portion of the counter clockwise light signal that exits the optical resonator; wherein the second photodetector is configured to generate a second feedback signal whose amplitude varies based upon incident power of a portion of the clockwise light signal that exits the optical resonator; a piezoelectric transducer around which the optical fiber of the primary coil is wound; a first voltage source coupled to the piezoelectric transducer and configured to generate a waveform having maxima and minima; a processing system; and wherein the processing system is configured to generate a signal, representative of an angular rotation rate around the input axis, with diminished bias error including diminished bias error arising about at least one of the waveform's maxima and minima.

Example 2 includes the resonant fiber optic gyroscope of Example 1, wherein the processing system configured to generate the signal, representative of the angular rotation rate around the input axis, with diminished bias error including diminished bias error arising about the waveform's maxima and minima comprises wherein the processing system configured to generate the signal, representative of the angular rotation rate around the input axis, with diminished bias error including diminished bias error arising about a waveform's maxima or minima following a linear region.

Example 3 includes the resonant fiber optic gyroscope of any of Examples 1-2, wherein the signal, representative of the rotation about the input axis, is dependent upon the difference between the frequencies of the clockwise light signal and the counter-clockwise light signal.

Example 4 includes the resonant fiber optic gyroscope of any of Examples 1-3, wherein the processing system comprises one or more random number generators.

Example 5 includes the resonant fiber optic gyroscope of any of Examples 1-4, wherein the coherent light sources comprise: a master laser; a first slave laser coupled to the master laser; a second slave laser coupled to the master laser; a CCW servo coupled to the master laser, the first slave laser, and at least one of a second voltage source and the first photodetector; a CW servo coupled to the master laser, the first slave laser, and the second photodetector; wherein the first slave laser is configured to provide the counter-clockwise light signal; and wherein the second slave laser is configured to provide the clockwise light signal.

Example 6 includes a method, comprising: generating a waveform; measuring signals representative of angular rotation rate in a linear region of the waveform; and diminishing bias error about at least one of the waveform's maxima and minima.

Example 7 includes the method of Example 6, wherein measuring signals representative of angular rotation rate in a linear region of the waveform comprises measuring a difference between a frequency of a clockwise light signal and a frequency of a counter-clockwise light signal.

Example 8 includes the method of any of Examples 6-7, further comprising calculating angular rotation rate around an input axis.

Example 9 includes the method of Example 8, wherein calculating the angular rotation rate around the input axis comprises calculating the angular rotation rate based upon difference between frequencies of a clockwise light signal and a counter-clockwise light signal.

Example 10 includes the method of any of Examples 6-9, wherein the measuring signals representative of the angular rotation rate in the linear region of the waveform comprises determining the start and end points of the linear region; and diminishing the bias error at the maxima or the minima of the waveform comprises terminating the measuring at or about the end point.

Example 11 includes the method of any of Examples 6-10, wherein diminishing bias error about at least one of a waveform's maxima and minima comprises: measuring signals representative of angular rotation rate in the maximum or minimum following the linear region; determining the average of signals representative of angular rotation measured in at least one linear region; determining the average of the signals representative of angular rotation measured in the maximum or minimum following the linear region; and determining the difference between the average of signals measured in at least one linear region, and the average of the signals measured in the maximum or minimum proximate to the at least one linear region; and adjusting the average of the signals measured in the maximum or minimum following the linear region.

Example 12 includes the method of Example 11, further comprising measuring signals representative of angular rotation rate in the linear region following the maximum or minimum; and wherein determining the average signals measured in at least one linear region comprises determining the average of signals measured in the linear regions proximate to the maximum or minimum.

Example 13 includes the method of any of Examples 11-12, wherein adjusting the average of the signals measured in the maximum or minimum following the linear region further comprises adjusting the averages of signal representative of angular rotation rate at all succeeding maxima and minima, of the waveform, by the difference.

Example 14 includes the method of any of Examples 11-13, wherein diminishing the bias error at the maxima or the minima of the waveform comprises: calculating an average of the signals representative of angular rotation rate in the linear region; measuring signals representative of angular rotation rate in the maximum or minimum following the linear region; determining a time when the signal representative of angular rotation rate in the maximum or minimum following the following the linear region equals the average of the signals representative of angular rotation rate in the linear region; and adjust the timing of maximum or minimum so that it is coincident with the time when the signal representative of angular rotation rate in the maximum or minimum following the following the linear region equals the average of the signals representative of angular rotation rate in the linear region.

Example 15 includes the method of any of Examples 6-14, wherein generating the waveform comprises generating waveform with amplitudes of maxima and minima that vary randomly over time; and wherein diminishing bias error at maxima or minima of the waveform comprises: measuring signals representative of angular rotation rate in the maximum or minimum succeeding the linear region; and determining an average of the signals of representative of the angular rotation rate measured in at least one linear region and at least one maximum or minimum succeeding a linear region.

Example 16 includes the method of Example 15, wherein generating waveform amplitudes with maxima and minima that vary randomly over time comprises generating waveform amplitudes of maxima and minima having the maximum variations that are constrained.

Example 17 includes the method of any of Examples 15-16, wherein generating waveform amplitudes with maxima and minima that vary randomly over time comprises varying the DC offset level of the waveform.

Example 18 includes the method of Example 17, wherein generating waveform amplitudes with maxima and minima that vary randomly over time further comprises randomly varying the maximum level of the maxima; and wherein the random variations of the DC offset level and the maximum level of the maxima are uncorrelated.

Example 19 includes a system, comprising: a vehicle; wherein the vehicle includes one or more gyroscopes; and wherein at least one gyroscope comprises: coherent light sources; wherein the coherent light sources generate a clockwise light signal and a counter-clockwise light signal; an optical resonator, coupled to the coherent light sources, formed from optical fiber and including a primary coil; an input axis parallel to a center axis of the primary coil of the optical resonator; wherein a portion of the clockwise light signal and a portion of the counter-clockwise light signal propagate respectively clockwise and counter-clockwise around the optical resonator and the input axis; a first photodetector coupled to the optical resonator; a second photodetector coupled to the optical resonator; wherein the first photodetector is configured to generate a first feedback signal whose amplitude varies based upon incident power of a portion of the counter clockwise light signal that exits the optical resonator; wherein the second photodetector is configured to generate a second feedback signal whose amplitude varies based upon incident power of a portion of the clockwise light signal that exits the optical resonator; a piezoelectric transducer around which the optical fiber of the primary coil is wound; a first voltage source coupled to the piezoelectric transducer and configured to generate a waveform having maxima and minima; a processing system; and wherein the processing system is configured to generate a signal, representative of an angular rotation rate around the input axis, with diminished bias error including diminished bias error arising about at least one of a waveform's maxima and minima.

Example 20 includes the system of Example 19, wherein the processing system configured to generate the signal, representative of the angular rotation rate around the input axis, with diminished bias error including diminished bias error arising about at least one of the waveform's maxima and minima comprises a processing system configured to generate a signal, representative of an angular rotation rate around the input axis, with diminished bias error including diminished bias error arising about at least one of a waveform's maxima and minima following a linear region.

It will be evident to one of ordinary skill in the art that the processes and resulting apparatus previously described can be modified to form various apparatuses having different circuit implementations and methods of operation. Notwithstanding that the numerical ranges and parameters setting forth the broad scope of the present teachings are approximations, the numerical values set forth in the specific examples are reported as precisely as possible.

Although voltages may be described herein, e.g. PZT voltage, $V_{MAX}$ 406, and DC offset voltage 408, in some embodiments currents may be used in their stead. Therefore, the term signals and waveforms may be used to refer to voltage or current signals or waveforms. Further, the term level may be used to refer to levels that are either voltage or current levels.

Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the scope of the appended claims. In addition, while a particular feature of the present disclosure may have been described with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B or A and/or B, means A alone, B alone, or A and B. The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material.

The terms "about" or "substantially" indicate that the value or parameter specified may be somewhat altered, as long as the alteration does not result in nonconformance of the process or structure to the illustrated embodiment. Finally, "exemplary" indicates the description is used as an example, rather than implying that it is an ideal. Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A resonant fiber optic gyroscope, comprising:
   coherent light sources;
   wherein the coherent light sources generate a clockwise light signal and a counter-clockwise light signal;
   an optical resonator, coupled to the coherent light sources, formed from optical fiber and including a primary coil;
   an input axis parallel to a center axis of the primary coil;
   wherein a portion of the clockwise light signal and a portion of the counter-clockwise light signal enter and propagate respectively clockwise and counter-clockwise around the optical resonator and the input axis;
   a first photodetector coupled to the optical resonator;
   a second photodetector coupled to the optical resonator;
   wherein the first photodetector is configured to generate a first feedback signal whose amplitude varies based upon incident power of a portion of the counter-clockwise light signal that exits the optical resonator;
   wherein the second photodetector is configured to generate a second feedback signal whose amplitude varies based upon incident power of a portion of the clockwise light signal that exits the optical resonator;
   a piezoelectric transducer around which the optical fiber of the primary coil is wound;
   a first voltage source coupled to the piezoelectric transducer and configured to generate a waveform having maxima and minima;
   a processing system; and
   wherein the processing system is configured to generate a signal, representative of an angular rotation rate around the input axis, with diminished bias error including diminished bias error arising about at least one of the waveform's maxima and minima.

2. The resonant fiber optic gyroscope of claim 1, wherein the processing system configured to generate the signal, representative of the angular rotation rate around the input axis, with diminished bias error including diminished bias error arising about the waveform's maxima and minima comprises wherein the processing system configured to generate the signal, representative of the angular rotation rate around the input axis, with diminished bias error including diminished bias error arising about a waveform's maxima or minima following a linear region.

3. The resonant fiber optic gyroscope of claim 1, wherein the signal, representative of the rotation about the input axis, is dependent upon the difference between the frequencies of the clockwise light signal and the counter-clockwise light signal.

4. The resonant fiber optic gyroscope of claim 1, wherein the processing system comprises one or more random number generators.

5. The resonant fiber optic gyroscope of claim 1, wherein the coherent light sources comprise:
a master laser;
a first slave laser coupled to the master laser;
a second slave laser coupled to the master laser;
a CCW servo coupled to the master laser, the first slave laser, and at least one of a second voltage source and the first photodetector;
a CW servo coupled to the master laser, the first slave laser, and the second photodetector;
wherein the first slave laser is configured to provide the counter-clockwise light signal; and
wherein the second slave laser is configured to provide the clockwise light signal.

6. A method, comprising:
generating a clockwise light signal and a counter-clockwise light signal coupled to a coil of optical fiber of an optical resonator;
generating a waveform from a signal generator configured to cause the coil of optical fiber to expand and contract;
measuring signals representative of angular rotation rate of the optical resonator in a linear region of the waveform; and
diminishing bias error, in the signals representative of the angular rate of rotation, about at least one of the waveform's maxima and minima.

7. The method of claim 6, wherein measuring the signals representative of the angular rotation rate in a linear region of the waveform comprises measuring a difference between a frequency of the clockwise light signal and a frequency of the counter-clockwise light signal.

8. The method of claim 6, further comprising calculating angular rotation rate around an input axis of the coil of optical fiber.

9. The method of claim 8, wherein calculating the angular rotation rate around the input axis of the coil of optical fiber comprises calculating the angular rotation rate based upon difference between frequencies of the clockwise light signal and the counter-clockwise light signal.

10. The method of claim 6, wherein the measuring signals representative of the angular rotation rate in the linear region of the waveform comprises determining start and end points of the linear region; and diminishing the bias error at the maxima or the minima of the waveform comprises terminating the measuring at or about the end point.

11. The method of claim 6, wherein diminishing the bias error, in the signals representative of the angular rate of rotation, about the at least one of a waveform's maxima and minima comprises:
measuring signals representative of angular rotation rate in the maximum or minimum following the linear region;
determining the average of signals representative of angular rotation measured in at least one linear region;
determining the average of the signals representative of angular rotation measured in the maximum or minimum following the linear region; and
determining the difference between the average of signals measured in at least one linear region, and the average of the signals measured in the maximum or minimum proximate to the at least one linear region; and
adjusting the average of the signals measured in the maximum or minimum following the linear region.

12. The method of claim 11, further comprising measuring signals representative of angular rotation rate in the linear region following the maximum or minimum; and wherein determining the average signals measured in at least one linear region comprises determining an average of signals measured in the linear regions proximate to the maximum or minimum.

13. The method of claim 11, wherein adjusting the average of the signals measured in the maximum or minimum following the linear region further comprises adjusting averages of signal representative of angular rotation rate at all succeeding maxima and minima, of the waveform, by the difference.

14. The method of claim 11, wherein diminishing the bias error at the maxima or the minima of the waveform comprises:
calculating an average of the signals representative of angular rotation rate in the linear region;
measuring signals representative of angular rotation rate in the maximum or minimum following the linear region;
determining a time when the signal representative of angular rotation rate in the maximum or minimum following the following the linear region equals the average of the signals representative of angular rotation rate in the linear region; and
adjusting the timing of maximum or minimum so that it is coincident with the time when the signal representative of angular rotation rate in the maximum or minimum following the following the linear region equals the average of the signals representative of angular rotation rate in the linear region.

15. The method of claim 6, wherein generating the waveform comprises generating waveform with amplitudes of maxima and minima that vary randomly over time; and
wherein diminishing the bias error at maxima or minima of the waveform comprises:
measuring signals representative of angular rotation rate in the maximum or minimum succeeding the linear region; and
determining an average of the signals of representative of the angular rotation rate measured in at least one linear region and at least one maximum or minimum succeeding a linear region.

16. The method of claim 15, wherein generating the waveform amplitudes with maxima and minima that vary randomly over time comprises generating waveform amplitudes of maxima and minima having the maximum variations that are constrained.

17. The method of claim 15, wherein generating the waveform amplitudes with maxima and minima that vary randomly over time comprises varying a DC offset level of the waveform.

18. The method of claim 17, wherein generating the waveform amplitudes with maxima and minima that vary randomly over time further comprises randomly varying the maximum level of the maxima; and
wherein the random variations of the DC offset level and the maximum level of the maxima are uncorrelated.

19. A system, comprising:
a vehicle;
wherein the vehicle includes one or more gyroscopes; and
wherein at least one gyroscope comprises:

coherent light sources;
wherein the coherent light sources generate a clockwise light signal and a counter-clockwise light signal;
an optical resonator, coupled to the coherent light sources, formed from optical fiber and including a primary coil;
an input axis parallel to a center axis of the primary coil of the optical resonator;
wherein a portion of the clockwise light signal and a portion of the counter-clockwise light signal propagate respectively clockwise and counter-clockwise around the optical resonator and the input axis;
a first photodetector coupled to the optical resonator;
a second photodetector coupled to the optical resonator;
wherein the first photodetector is configured to generate a first feedback signal whose amplitude varies based upon incident power of a portion of the counter clockwise light signal that exits the optical resonator;
wherein the second photodetector is configured to generate a second feedback signal whose amplitude varies based upon incident power of a portion of the clockwise light signal that exits the optical resonator;

a piezoelectric transducer around which the optical fiber of the primary coil is wound;
a first voltage source coupled to the piezoelectric transducer and configured to generate a waveform having maxima and minima;
a processing system; and
wherein the processing system is configured to generate a signal, representative of an angular rotation rate around the input axis, with diminished bias error including diminished bias error arising about at least one of a waveform's maxima and minima.

20. The system of claim 19, wherein the processing system configured to generate the signal, representative of the angular rotation rate around the input axis, with diminished bias error including diminished bias error arising about at least one of the waveform's maxima and minima comprises a processing system configured to generate a signal, representative of an angular rotation rate around the input axis, with diminished bias error including diminished bias error arising about at least one of a waveform's maxima and minima following a linear region.

* * * * *